United States Patent [19]

Yamashita

[11] Patent Number: 5,111,305
[45] Date of Patent: May 5, 1992

[54] VIDEO DISK PLAYER HAVING CLV FORMAT

[75] Inventor: Noriyuki Yamashita, Tokyo, Japan

[73] Assignee: Sony Corporation, Tokyo, Japan

[21] Appl. No.: 472,748

[22] Filed: Jan. 31, 1990

[30] Foreign Application Priority Data

Jan. 31, 1989 [JP] Japan .................................... 1-21171

[51] Int. Cl.$^5$ ........................... H04N 5/76; G11B 7/00
[52] U.S. Cl. ..................................... 358/342; 369/50; 369/44.32; 358/907
[58] Field of Search ............... 358/342, 338, 310, 335, 358/907; 369/32, 50, 133, 240, 44.32

[56] References Cited

U.S. PATENT DOCUMENTS 4,800,445  1/1989  Kanda ................................. 358/342
4,862,291  8/1989  Nakajima et al. .................... 358/342

Primary Examiner—Robert L. Richardson
Attorney, Agent, or Firm—Limbach & Limbach

[57] ABSTRACT

In a video disk player during the scan reproducing mode, a jump of a calculated number of tracks is carried out so that, even when a video disk is recorded according to the constant linear format, it is possible to reproduce a picture in which vertical synchronization can be prevented from being disturbed or a picture in which even when the disturbance of the vertical synchronization occurs, such disturbed vertical synchronization can be readily eliminated.

10 Claims, 10 Drawing Sheets

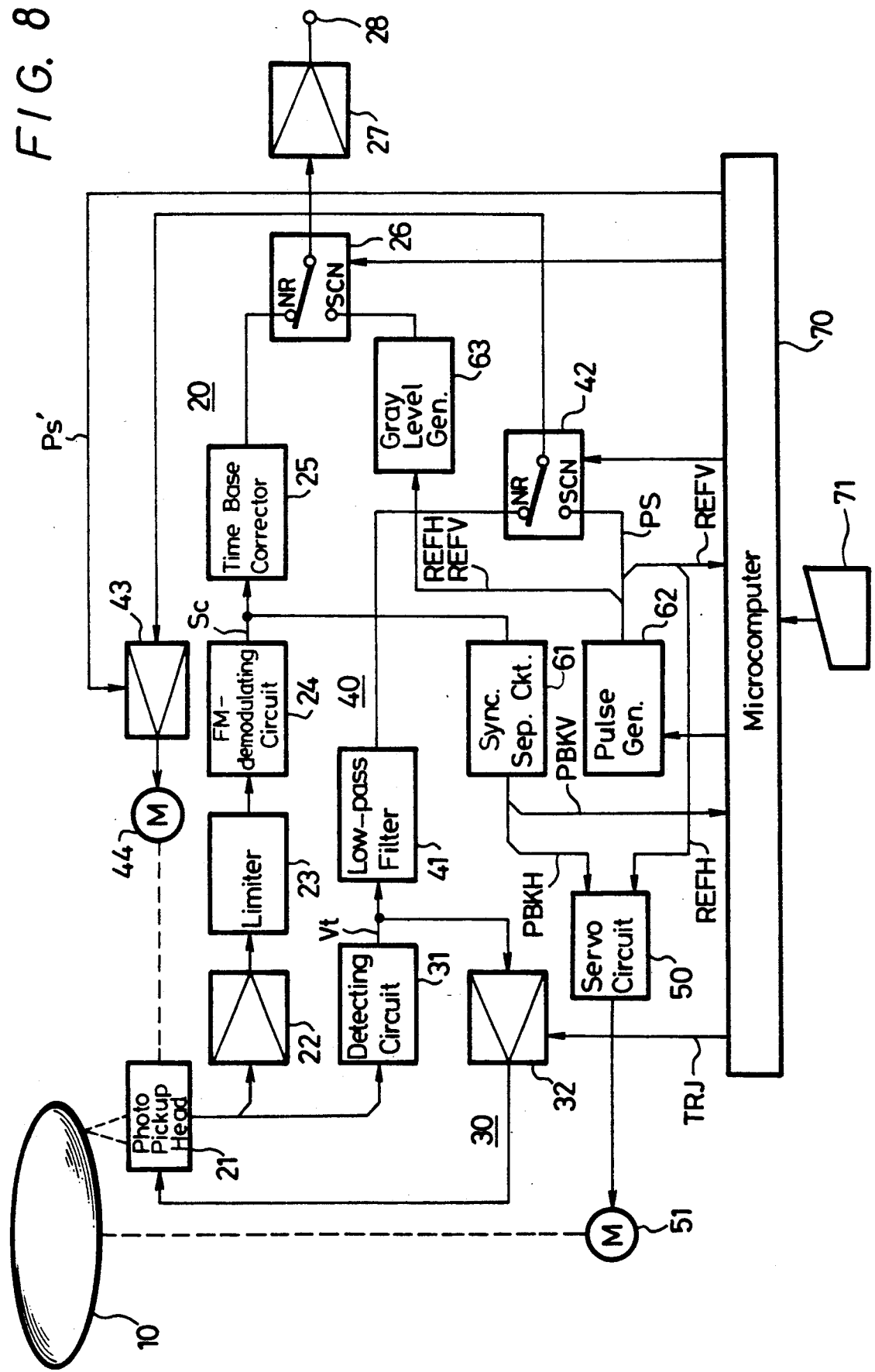

VIDEO DISK PLAYER HAVING CLV FORMAT

BACKGROUND OF THE INVENTION

1. Field of the Invention

The present invention relates generally to a video disk player and a method for reproducing a video disk and, more particularly, is directed to a so-called slide servo or sled servo control apparatus for use with a video disk player.

2. Description of the Prior Art

In an optical type video disk player, when a photo pickup head is moved in the radius direction of the video disk at a speed higher than that in the normal playback mode, e.g. during a track scanning operation, while the photo pickup head is controlled by the tracking servo, an objective lens provided within the photo pickup head tries to remain directed toward the original track against the movement of the photo pickup head. Accordingly, the position of the optical axis of the objective lens (the position in the track width direction seen from the photo pickup head) is changed as shown by a corresponding waveform of FIG. 1A.

FIG. 1A shows the waveform of the tracking error voltage supplied to a drive coil (tracking coil) of the objective lens. In FIG. 1A, the abscissa indicates a moved amount (passed time) of the photo pickup head, whereas the ordinate indicates the position of the optical axis of the objective lens (tracking error compensating voltage Vc). As shown in FIG. 1A, during a period Td, tracking is correctly carried out and at this time the position of the optical axis of the objective lens is gradually deviated from the optical path of a laser light source in accordance with the movement of the photo pickup head. Soon after, the tracking servo can not follow such displacement, or the deviated position of the objective lens relative to the optical path of the laser light source reaches a limit in which the signal can be reproduced so that, during a period Tj, a tracking error compensating voltage Vc is forced to change to effect a so-called track jump. In the following description, a track jump means that the center of the objective lens is caused to jump in the width direction of the track by utilizing a moving coil.

In that case, owing to the track jump, the optical axis position of the objective lens is returned to the center of the visual field. In FIG. 1A, a value S corresponds to the visual field of the objective lens and is equivalent to about ±250 tracks.

Generally, the aforementioned tracking servo is referred to as a slide servo or sled servo, and the outline thereof will now be described with reference to FIG. 2. A spindle motor 1 rotates an optical disk 2, and a laser beam emitted from a laser light source 3 is inputted to an optical block 4.

The introduced beam travels through a half mirror 5 or the like and is emitted from an objective lens 6 as a beam B to irradiate tracks T on the optical disk 2. Two such optical blocks 4 are shown in the figure for purposes of illustrating the operation of the device, but it is to be understood that only one such block exists in actual practice The block 4 on the left side of FIG. 2 represents the situation where the beam B is centered over a given one of the tracks T whereas the rightmost block 4 represents the situation where the beam B initially is centered between two tracks T.

In the latter case, a DC component in a tracking signal Vt, obtained from a reflected beam (not shown) on the optical disk 2 is detected by a detector 7. Then, an error compensating signal Vc corresponding to the error amount therefrom is supplied to a tracking coil 8 as a tracking control signal such that the central position of the objective lens 6 always coincides with the center of the tracks T. A correctly centered beam B' is emitted from the objective lens, now denoted as 6', that is deviated to one direction from the position of the objective lens 6 forming an optical path of the beam B at the central position. This objective lens 6 is located at the limit position of the movable range. In FIG. 2, although the diameter of the light bundle of the beam is about 6.6 mm relative to the diameter (4.5 mm) of the objective lens 6 in practice, these relations are simplified for convenience.

In FIG. 2, an arrow S represents the direction in which the optical block 4 is moved by a sled motor (not shown)

In the period Td (FIG. 1A), the tracking of the objective lens is correctly carried out, so that the picture is displayed by a reproduced signal. In the period Tj, the tracking of the objective lens is not correctly carried out so that the spindle servo control of disk rotation can not correctly carried out. Consequently, in the period Tj, the reproduced signal is muted to provide, for example, a gray screen.

In the scan mode, therefore, the ordinary reproduced picture in the period Td and the muted picture in the period Tj are alternately displayed, or the ordinary reproduced picture in the period Td is intermittently displayed in response to the moving speed of the photo pickup head, whereby a reproduced picture in the fast forward or fast rewind mode can be obtained. This operation mode will be referred to as "scan mode" or "scan reproducing mode".

A constant angular velocity (CAV) system and a constant linear velocity (CLV) system are two known types of recording systems for a video disk. In the CAV system, the revolution rate of a disk is constant, for example, 1800 r.p.m., and per revolution, a video signal of one frame is recorded and a synchronizing signal is recorded in the radius direction. The CAV system provides a special playback function such as a still picture mode and the like, and the playback time is a maximum of 30 minutes for one side of a 30-cm disk.

In the CLV system, a video signal is recorded at a constant linear velocity of about 11 m/sec. The revolution rate at which a video signal is read-out from the inner periphery of the disk is 1800 r.p.m. (one frame per revolution) whereas the revolution rate in which a video signal is read-out from the outer periphery of the disk is 600 r.p.m. (three frames per revolution). Further, the revolution rate when a video signal is read-out from the intermediate portion of the disk is 900 r.p.m. (two frames per revolution) and the maximum playback time is 60 minutes for one side of the 30-cm disk.

FIG. 3 shows the location of a video signal recorded according to the CLV system. It is to be understood from FIG. 3 that two video fields are recorded in the innermost portion of the disk and that 6 fields are recorded in the outermost portion of the video disk.

In the case of the video disk recorded according to the CLV format, each time the video disk is rotated, an angular position in which a vertical synchronizing signal is recorded (shown by a solid circle in FIG. 4) is deviated little by little so that, when the video disk recorded according to the CLV format is reproduced in the scan mode, a picture is reproduced with a disturbed vertical synchronization. A track interval is illustrated in an enlarged-scale in FIG. 4, and therefore, the position of the vertical synchronizing signal is considerably changed.

Assuming that P is the track pitch $= 1.67 \times 10^{-6}$ (m), R is the radius of the innermost periphery of the track $= 55 \times 10^{-3}$ (m) and that N is the track number $= 1$ to 54000, then the length L of N'th track is determined as $$L = 2\pi(R + P(N-1)) \, (m) \quad (i)$$

Video signals of two fields are recorded in the innermost peripheral track of the video disk according to the CLV format and one length of track is fixed as $\pi R$ so that the number F of the fields involved in the N'th track is expressed by the following equation:

$$\begin{aligned} F &= L/(\pi R) \\ &= 2 + (2P/R)(N-1) \\ &= 2 + k(N-1) \, [\text{field}] \end{aligned} \quad (ii)$$

Since $k = 2P/R \approx 60.73$ (p.p.m), $N=1$ yields $F=2$ fields, and $N=54000$ yields $F \approx 5.28$ fields The value k in the equation (ii) represents the amount by which the angular position in which the vertical synchronizing signal is recorded is changed when one track jump is carried out. That is, the value k indicates an amount in which the phase of the reproduced vertical synchronizing signal is changed.

The relationship between the track and the vertical synchronizing pulse Vsync in FIG. 4 will be described more fully with reference to FIGS. 5A to 5C.

FIG. 5A shows a condition near a track portion where two video fields are recorded in one track, wherein vertical synchronizing pulses Vsync are aligned substantially in the radius direction of the disk with a reference vertical synchronizing pulse (shown by a chain line) which is generated by the video disk player. FIG. 5B shows a condition near a track portion in which three video fields are recorded in one track, wherein although the vertical synchronizing pulses Vsync are aligned substantially in the radius direction of the disk similarly to FIG. 5A, the phase of the reproduced vertical synchronizing pulses Vsync is deviated with a deviation of several 10s of percents from the phase of the reference vertical synchronizing pulse. This is because a spindle servo is applied so that the phase of the vertical synchronizing pulse of the reproduced video signal coincides with the reference phase. In that case, the phase of the vertical synchronizing pulse in the recorded signal is considerably deviated from the phase of the reference vertical synchronizing pulse so that, in the scan mode, the photo pickup head can not be pulled into a servo controllable range of $\pm 3\%$ by the servo control. If the photo pickup head is jumped into a track in this area, then a picture can not be immediately reproduced and so, this area is referred to as a dead zone track area.

FIG. 5C illustrates a condition near a track portion where 2.7 video fields are recorded in one track. As shown in FIG. 5C, the recorded positions of the vertical synchronizing pulses are scattered around the recorded positions of the reference vertical synchronizing pulse. If the track shifting is carried out for at least 10 or more tracks near this track portion, then at least a vertical synchronizing pulse of a certain track falls within the pull-in range of the servo control.

It is to be understood from FIGS. 5A to 5C that, when a track jump is carried out near the tracks of F $=2$, 3, 4 and 5, if the number of tracks jumped is small (9 tracks in FIGS. 5A to 5C), the phase change of the vertical synchronizing pulse in the reproduced video signal after the track jump is small as compared with that occurring before the track jump. It is needless to say that, even when a track jump is carried out near the tracks of F$=2$, 3, 4 and 5, if the number of jumped tracks is selected to be very large, then the phase change of the vertical synchronizing pulse after the track jump is carried out can be made large. In this connection, the number of tracks in which 2, 3, 4 and 5 fields of the video signal are recorded in one track is expressed by the following equation $$N = 1 + \frac{R}{2P}(F-2) \quad (iii)$$

If $F=2$, 3, 4 and 5 is substituted into the above equation (iii), this yields $N=1$, $N=16468$, $N=32935$ and $N=49402$, respectively.

When a track jump is carried out near the track of $F=2.5$, 3.5, 4.5, ..., even if the number of tracks jumped is small, the phase of the reproduced vertical synchronizing pulse after the track jump is considerably changed as compared with that changed before the track jump. In the case of FIG. 5C, the phase of the vertical synchronizing pulse is considerably changed only by a track jump of one track from $N=11500$, whereby the vertical synchronizing pulse enters a region of $\pm 3\%$.

In the following description, an area in which the phase change of the vertical synchronizing pulse after the track jump is small and in which the phase of the reproduced vertical synchronizing pulse after a track jump of 10 or more tracks can not reach the phase of the reference vertical synchronizing pulse is referred to as "dead zone track area". Accordingly, if the dead zone track area of the video disk recorded according to the CLV format is reproduced in the conventional scan reproduction mode, a picture is reproduced wherein the vertical synchronization thereof is disturbed.

To avoid this defect, it is proposed that, in the scan reproduction mode, if the phase of the vertical synchronizing pulse contained in the reproduced video signal is continuously large (more than $\pm 3\%$) relative to the phase of the reference vertical synchronizing pulse, the above vertical synchronizing pulse is removed and a new vertical synchronizing pulse is inserted into a position in which a time series is continued. In this proposal, however, although the vertical synchronization is not disturbed, a black band corresponding to the removed vertical synchronizing pulse appears in the reproduced picture or the upper half portion and the lower half portion of the reproduced picture are reproduced in the picture screen in a vertically reversed fashion. These conditions are represented in FIG. 6 and FIGS. 7A to 7C wherein FIG. 6 illustrates the vertical synchronizing pulse PBV and the reference vertical synchronizing pulse REFV of the reproduced picture, whereas FIG. 7A to 7C illustrate the examples of the reproduced pictures monitored on a television receiver.

OBJECTS AND SUMMARY OF THE INVENTION

Therefore, it is an object of the present invention to provide an improved apparatus and method for reproducing a video disk in a scan mode which can eliminate the above-mentioned defects encountered with the prior art.

More specifically, it is an object of the present invention to provide an improved apparatus and method for reproducing a video disk in a scan mode by which disturbance of the vertical synchronization of a reproduced picture can be avoided in the scan reproduction mode.

It is another object of the present invention to provide an improved apparatus and method for reproducing a video disk in a scan mode by which a scan reproduced picture of good image quality can be provided.

As a first aspect, a video disk player for reproducing a constant linear velocity (CLV) formatted video disk in a scan mode comprises:

(a) photo pickup means for reproducing a video signal from the video disk, the photo pickup means including an objective lens having a optical axis;

(b) tracking servo means supplied with the output of the photo pickup means for effecting a tracking servo of the photo pickup means;

(c) first means for selectively moving the optical axis of the objective lens in the radial direction relative to the video disk to produce a track jump;

(d) second means for generating a pseudo-video signal;

(e) third means for generating a reference vertical frequency signal;

(f) an output terminal;

(g) switching means connected to receive the output of the photo pickup means and the pseudo-video signal of the second means and for selectively supplying one of them to the output terminal; and (h) programmed control means supplied with the output of the photo pickup means for (i) causing the first means during a scan mode to carry out a first track jump of a relatively large number of tracks for the video disk while causing the switch means to supply the pseudo-video signal instead of the reproduced video signal to the output terminal, (ii) extracting a vertical synchronizing signal from the reproduced information recorded on the disk and detecting a phase difference between a vertical synchronizing pulse of the reproduced video signal and the reference vertical frequency signal after the first track jump is carried out, (iii) causing the switch means to supply the reproduced video signal instead of the pseudo-video signal to the output terminal when the detected phase difference is smaller than a predetermined value, (iv) calculating, when the detected phase difference is larger than the predetermined value, the number of tracks which must be jumped for the phase difference to become smaller than the predetermined value, (v) determining, when the calculated number of tracks to be jumped is larger than a predetermined value, that the position of the photo pickup means lies in a dead zone track area relative to the position of the vertical synchronizing pulse of the recorded video signal, and causing the first means to carry out a second track jump of a medium number of tracks for the video disk when the dead zone track area is determined, thereby urging the photo pickup means to leave the dead zone track area.

A second aspect of the present invention is a method of reproducing a constant linear velocity (CLV) formatted video disk in a scan mode by means of a video disk player which comprises a photo pickup head for reproducing a video signal from the video disk comprising the steps of:

(a) generating a reference vertical frequency signal;

(b) causing the photo pickup head to make a first track jump in the radial direction of a relatively large number of tracks while generating as the output of the video disk player a pseudo-video signal instead of the video signal reproduced from the recorded information in the tracks in the scan reproducing mode;

(c) detecting a phase difference between a vertical synchronizing pulse of the reproduced video signal and the reference vertical frequency signal after the first track jump is carried out;

(d) generating as the output of the video disk player the reproduced video signal instead of the pseudo-video signal when the detected phase difference is smaller than a predetermined value;

(e) calculating, when the phase difference is larger than the predetermined value, the necessary number of tracks which must be jumped for the phase difference to become smaller than the predetermined value;

(f) determining, when the calculated number of tracks to be jumped is larger than a predetermined value, that the position of the photo pickup head lies in a dead zone track area relative to the position of a vertical synchronizing pulse of the recorded video signal; and (g) carrying out a second track jump of a medium number of tracks for the video disk when the dead zone track area is determined, thereby urging the photo pickup head to leave the dead zone track area.

The above, and other objects, features and advantages of the present invention, will become apparent in the following detailed description of a preferred embodiment to be read in conjunction with the accompanying drawings, in which like reference numerals are used to identify the same or similar parts in the several views.

BRIEF DESCRIPTION OF THE DRAWINGS

FIG. 8 is a block diagram showing an optical video system according to an embodiment of the present invention;

FIGS. 9A and 9B are, respectively, waveform diagrams to which reference will be made in explaining a relationship between a reproduced pulse and a track position;

DETAILED DESCRIPTION OF A PREFERRED EMBODIMENT

Figure 1:
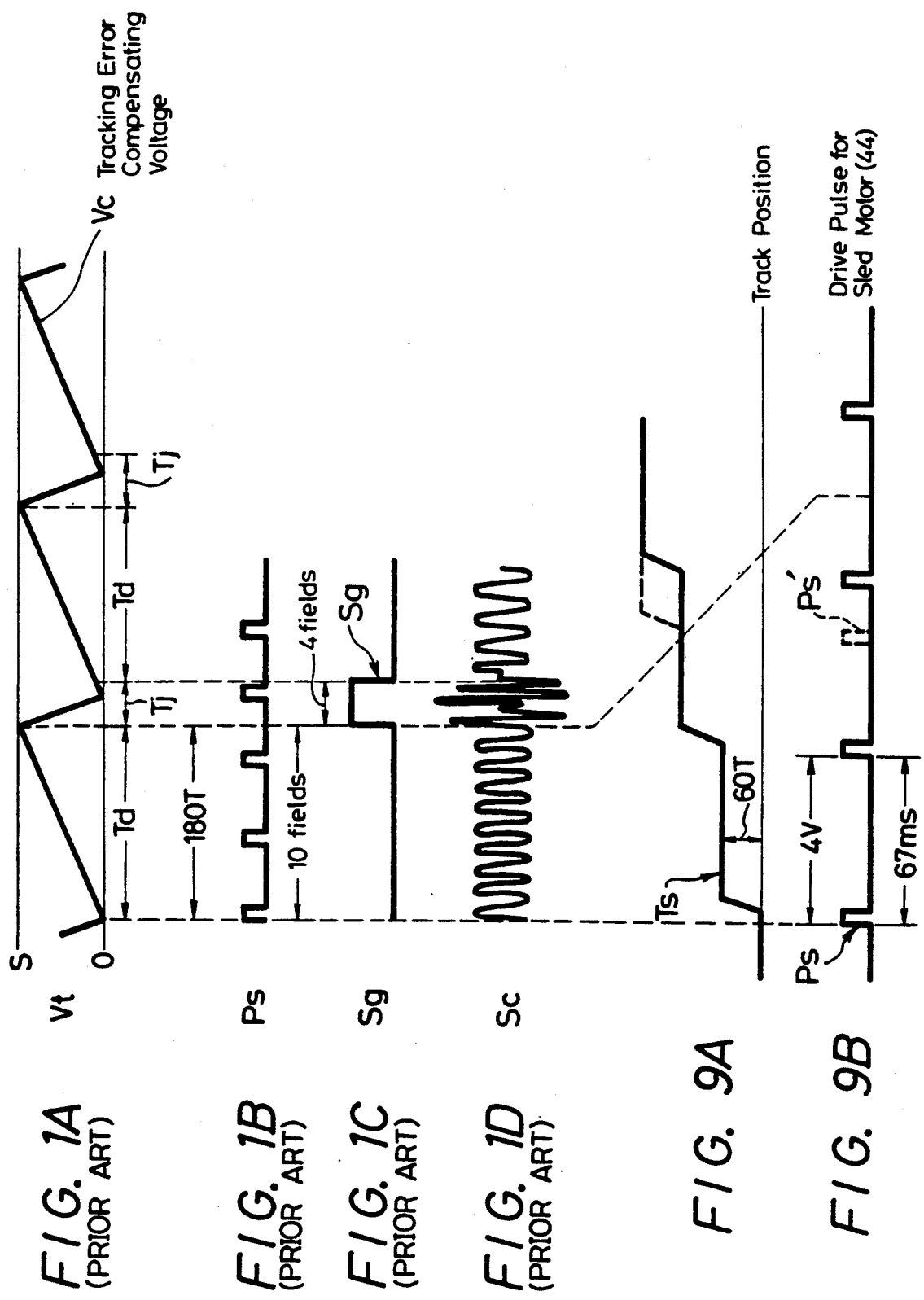
FIGS. 1A to 1D are schematic waveform diagrams to which reference will be made in explaining the prior art, respectively.

Referring to the drawings in detail, and initially to FIG. 8, the present invention will now be described. Referring to FIG. 8, there is shown an optical video disk 10 in which a signal, frequency-modulated by a color composite video signal, is recorded according to the CLV format. The optical video disk 10 is rotated by a spindle motor 51 and the rotation thereof is servo-controlled by a spindle servo circuit 50 such that the linear velocity of the optical video disk 10 can become constant.

There is provided a reproducing circuit 20 in which there is provided a radially movable photo pickup head 21 which is comprised of a laser light or beam emitting element, a laser light or beam receiving element, an objective lens and a tracking coil for moving the optical axis of the objective lens in the radius direction of the optical video disk 10, though not shown. The photo pickup head 21 is moved in the radius direction of the optical video disk 10 by a sled motor 44.

Figure 2:
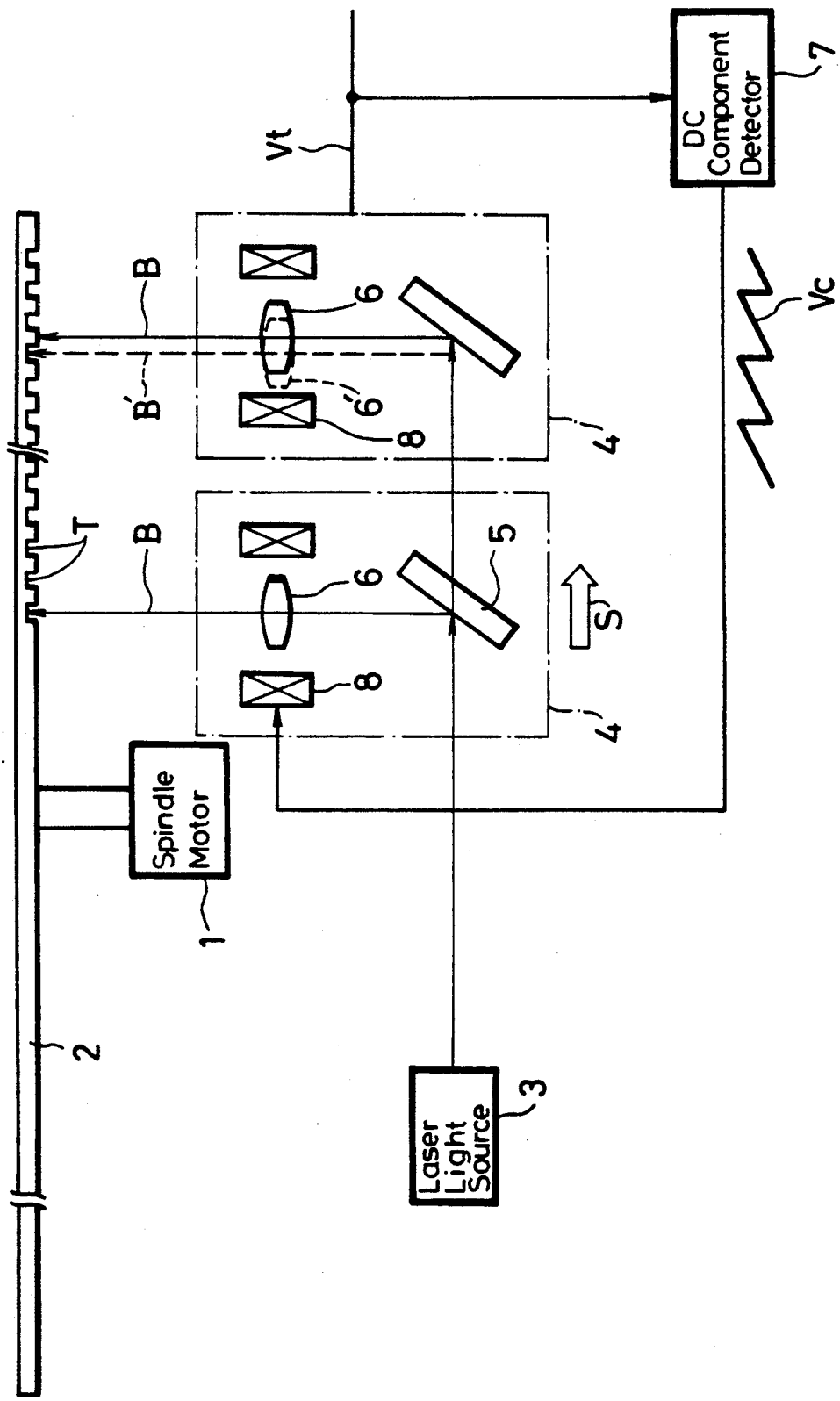
FIG. 2 is a block diagram showing a tracking servo system according to the prior art.
Figure 3:
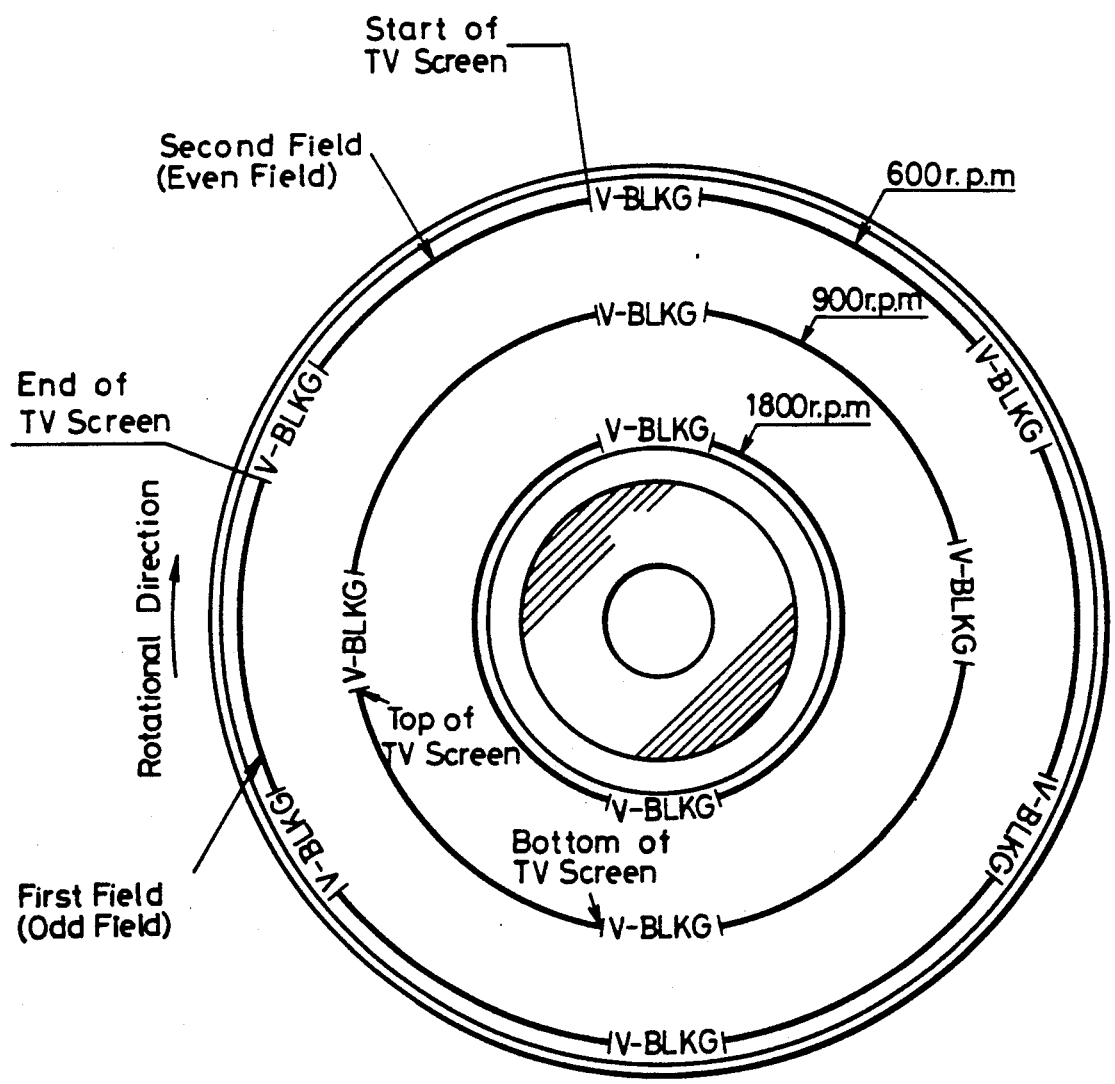
FIG. 3 is a schematic planar view illustrating an example of a constant linear velocity (CLV) system video disk according to the prior art.
Figure 4:
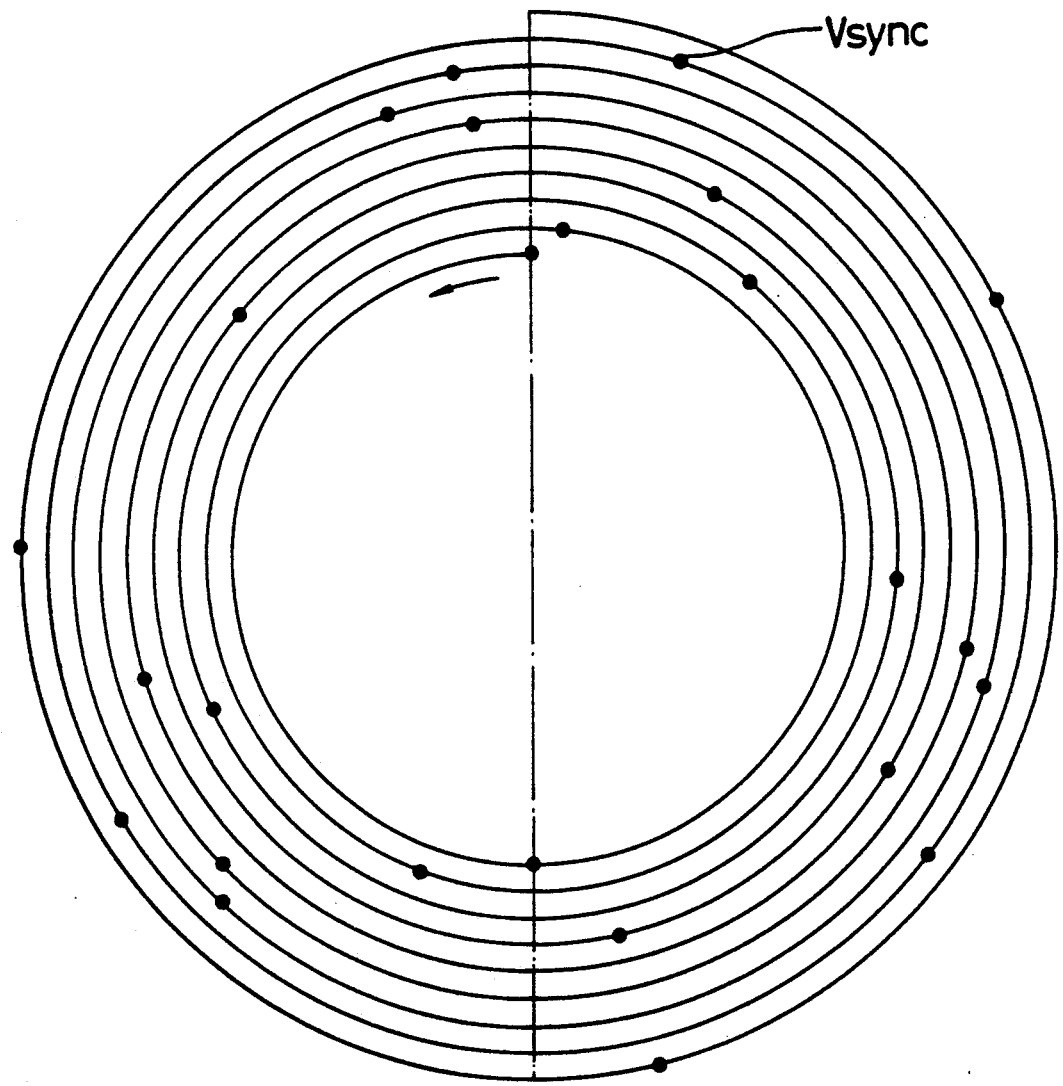
FIG. 4 is a schematic planar view of a CLV system video disk, and to which reference will be made in explaining a displacement of the angular position in which a vertical synchronizing pulse is recorded.

A tracking servo circuit 30 is provided, in which upon normal reproducing mode and in the scan reproducing mode, one portion of the output signal from the photo pickup head 21 is supplied to a detecting circuit 31 which derives a tracking error voltage Vt. This tracking error voltage Vt is supplied through an amplifier 32 to the tracking coil of the photo pickup head 21, thereby effecting the tracking servo for the objective lens in the manner previously described in reference to FIG. 2.

There is shown a sled servo circuit 40 in which, in the normal reproducing mode, the tracking error voltage Vt from the detecting circuit 31 is supplied to a low-pass filter 41 which derives a DC component of the tracking error voltage Vt. This DC component is supplied through a switching circuit 42, connected in the illustrated state (i.e., NR position) in the normal reproducing mode, and an amplifier 43 to the sled motor 44, thereby effecting a sled servo.

Therefore, in the normal reproducing mode, the tracking servo circuit 30 and the sled servo circuit 40 effect the tracking servo and the sled servo so that the photo pickup head 21 can correctly follow the tracks on the optical video disk 10. Thus, a reproduced signal is derived from the photo pickup head 21.

This reproduced signal is supplied through a playback amplifier 22 and a limiter 23 to an FM demodulating circuit 24, in which it is demodulated to provide a color composite video signal Sc. This color composite video signal Sc is supplied through a series connected circuit of a time base corrector 25, a switching circuit 26, connected in the illustrated state (NR-position) in the normal reproducing mode, and an output amplifier 27 to an output terminal 28.

Simultaneously, the video signal Sc from the FM demodulating circuit 24 is supplied to a synchronizing separating circuit 61 which derives a horizontal synchronizing pulse PBKH and a vertical synchronizing pulse PBKV. The horizontal synchronizing pulse PBKH is supplied to the servo circuit 50 and the vertical synchronizing pulse PBKV is supplied to a microcomputer 70. A pulse generating circuit 62, under control of the microcomputer 70, derives a reference horizontal frequency pulse REFH and a reference vertical frequency pulse REFH. The pulse REFH is also supplied to the spindle servo circuit 50, thus effecting the aforementioned spindle servo.

The reference horizontal frequency pulse REFH and the vertical frequency pulse REFV, derived from the pulse generating circuit 62, are supplied to a gray level generating circuit 63 which generates a pseudo-video signal Sg that is reproduced as a gray picture during the period Tj (see FIG. 1A). This pseudo-video signal Sg is supplied to another contact terminal (at the SCN position) of the switching circuit 26. The reference vertical frequency pulse REFV is also supplied to the microcomputer 70.

The pulse generating circuit 62 generates a pulse Ps at every four field periods, for example, as shown by a solid line in FIG. 9B. This pulse Ps is supplied through the SCN-position contact of the switching circuit 42 to the sled motor amplifer 43. The pulse Ps causes the sled motor 44 to move the photo pickup head 21 by, for example, 60 tracks for each pulse Ps in the scan reproducing mode. This state is represented by a track moved amount Ts in FIG. 9A.

In that case, 15 pulses Ps are generated per second and the photo pickup head 21 is moved by 900 tracks (=60 tracks×15) so (=54000 tracks/900 tracks) for the photo pickup head 21 to move from the first track to 54000'th track. Accordingly, the average reproducing speed in the scan reproducing mode as compared with the scanning speed in the normal scan mode becomes 60 times (=60 minutes (=normal reproducing time)/60 seconds; wherein 60 minutes is the total scanning time period over one CLV disk in the normal scanning mode).

Referring again to FIG. 8, as previously mentioned, there is provided a microcomputer 70 which controls the operation of the video disk player. The microcomputer 70 includes a scan reproducing program 100 as, for example, shown in FIG. 10. The microcomputer 70 is supplied with the vertical synchronizing pulse PBKV, contained in the reproduced video signal Sc, from the synchronizing separating circuit 61 and the reference vertical synchronizing pulse REFV from the pulse generating circuit 62. The microcomputer 70 supplies predetermined control signals to the circuits 26, 42, 32, 43 and 62.

In the normal reproducing mode, if a scan-reproducing fast-forward or fast-rewind key (details of these keys are not shown and denoted simply by reference numeral 71) is depressed, then the routine 100 is executed by the microcomputer 70 to perform the scan reproduction.

Figure 10:
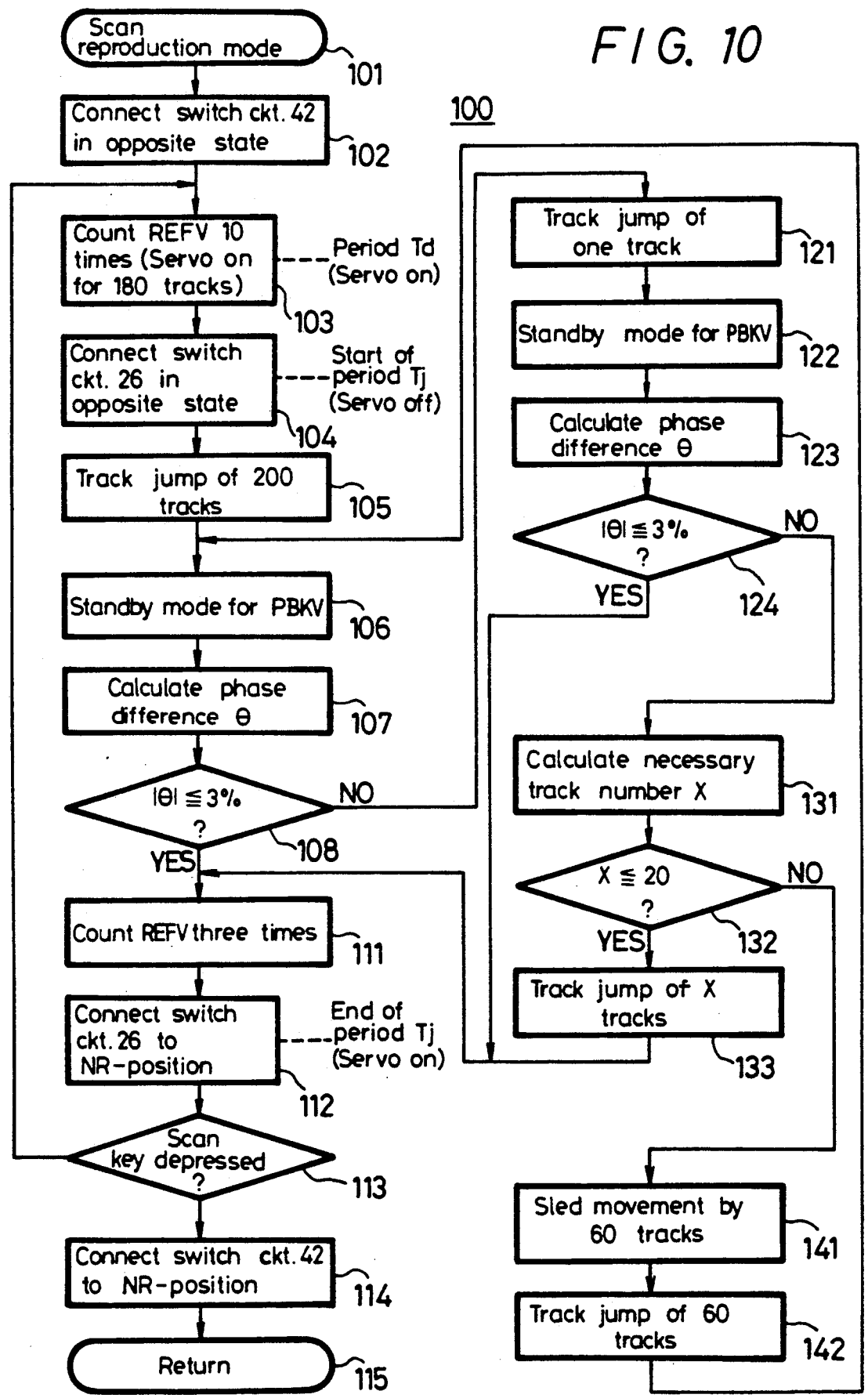
FIG. 10 is a flow chart to which reference will be made in explaining the steps involved in a routine of a scan reproducing mode according to the invention.

Referring to FIG. 10, when the scan reproduction key is depressed, the processing by the microcomputer 70 starts from step 101 in the routine 100. Then, the routine proceeds to step 102, whereat the switching circuit 42 is connected in the opposite state (SCN-position) to that illustrated, and in the next step 103, the pulses REFV are counted, for example, 10 times. Accordingly, in steps 102 and 103, over a 10-field period, the pulse Ps is supplied through the switching circuit 42 and the amplifier 43 to the sled motor 44, and the three pulses Ps exist in the 10-field period, whereby the photo pickup head 21 is moved in the fast-forward direction or in the fast-rewind direction by 180 tracks (=60 tracks×3) (see FIG. 9B).

The 10-field period corresponds to the period Td (see FIG. 1A) and at that time the tracking servo is effected by the servo circuit 30 so that the video signal Sc indicative of the normal picture is continuously obtained over the 10-field period (see FIG. 1D). In other words, of the visual images of 180 tracks, the first 10 pictures can be monitored by a television monitor (not shown) under a servo-controlled condition.

Then, the routine proceeds to step 104 where the switching circuit 26 is switched to the opposite state (SCN-position) to that illustrated, whereby the pseudo-video signal Sg indicative, for example, of a gray picture in a blue background is supplied through the switching circuit 26 and the amplifier 27 to the output terminal 28 (see FIG. 1C).

This time corresponds to the period Tj. In the normal reproduction mode, though not shown, in order to display passed time, a chapter number of a scene or the like on the reproduced picture, the reproduced synchronizing pulses PBKH, PBKV and the reproduced video signal Sc are made the same in phase as those of the reference synchronizing pulses REFH, REFV and the pseudo-video signal Sg so that, when the switching circuit 26 is changed in position to change the video signal Sc to the pseudo-video signal Sg, the reproduced picture of the optical video disk 10 is changed to a gray picture without disturbance of the vertical synchronization.

Then, the routine proceeds to step 105 where a track jump pulse TRJ is supplied from the microcomputer 70 to the amplifier 32. The pulse TRJ has a duration sufficient to forcibly carry out a relatively large track jump, for example, a track jump of 200 tracks. In the next step 106, the microcomputer 70 is set in the standby mode for receiving the reproduced vertical synchronizing pulse PBKV. In that case, the operation of the servo circuit 40 is in its OFF state.

If the reproduced vertical synchronizing pulse PBKV is obtained, the routine proceeds to step 107 where a phase difference Θ of the reproduced vertical synchronizing pulse PBKV relative to the reference vertical synchronizing pulse REFV is calculated. In the next decision step 108, it is determined whether or not the phase difference Θ is sufficiently small in the television monitor can be avoided. For example, it is determined whether or not $|\Theta| \leq 3\%$ is satisfied.

If $|\Theta| \leq 3\%$ is satisfied as represented by a YES at step 108, the routine proceeds from step 108 to step 111. In step 111, the reference vertical synchronizing pulse REFV is counted, for example, three times. This count period is a standby period in which the time base corrector (TBC) 25 or the like can be stabilized.

The routine proceeds to step 112, whereat the switching circuit 26 is switched to the illustrated state (NR-position) changing the signal Sg back to the signal Sc. Although this time point is the ending time point of the period Tj, the phase difference Θ between the pulses REFV and PBKV is small as represented by a YES at step 108 so that, when the signal Sg is changed to the signal Sc the gray picture is switched to the reproduced picture of the optical video disk 10 without disturbing the vertical synchronization.

The routine proceeds to the next decision step 13 where it is determined whether or not the scan reproduction key is depressed. If it is determined that the scan reproduction key is depressed as represented by a YES at step 113, the routine returns to step 103 from step 113. Accordingly, if the scan reproduction key is depressed, step 103 and the following steps are repeated again.

On the other hand, if it is determined at step 108 that $|\Theta| \leq 3\%$ is satisfied as represented by a NO, then the routine proceeds from step 108 to step 121. In step 121, the amplifier 32 is supplied with a relatively small duration track jump pulse TRJ, and a small track jump, for example, of one track is forcibly performed. In the next step 122, the microcomputer 70 is set in the standby mode to await the supply of the reproduced vertical synchronizing pulse PBKV.

If the reproduced vertical synchronizing pulse PBKV is obtained, then the routine proceeds to step 123. In step 123, similarly to step 107, the phase difference Θ between the pulses REFV and PBKV is calculated. In the next decision step 124, similarly to decision step 108, it is determined whether or not the phase difference Θ is less than or equal to 3% ($|\Theta| \leq 3\%$).

If $|\Theta| \leq 3\%$ is satisfied, the routine proceeds from step 124 to step 111. Therefore, in the subsequent step 112, the signal Sg is switched to the signal Sc and the period Tj is terminated. In that case, whether or not $|\Theta| \leq 3\%$ is determined at step 124 so that, when the gray picture is switched to the reproduced picture of the optical video disk 10 in step 112, a disturbance of the vertical synchronization can be avoided.

If it is determined in step 124 that $|\Theta| \leq 3\%$ is satisfied, the routine proceeds from step 124 to step 131. In step 131, the number of tracks needed to satisfy the inequality of $|\Theta| \leq 3\%$ is calculated and the number X of tracks to be jumped is obtained. In the next decision step 132, it is determined whether or not the necessary track jump number X is less than a predetermined value, for example, whether $X \leq 20$ is satisfied or not. If it is determined that $X \leq 20$ is satisfied as represented by a YES at step 132, the routine proceeds from step 132 to step 133. The calculation of the track jump number X will be described briefly in a later stage.

At step 133, the amplifier 32 is supplied with a track jump pulse TRJ having a duration sufficient to carry out a track jump of X tracks. Then, the routine proceeds to step 111. Accordingly, in step 112, the signal Sg is switched to the signal Sc, and the period Tj is terminated as set out above. Also in this case, the X-track jump is carried out at step 133 to satisfy the inequality of $|\Theta| \leq 3\%$, whereby the gray picture is switched to the reproduced picture of the optical video disk 10 without disturbance of the vertical synchronization.

On the other hand, if at step 132 it is determined that an inequality of X>20 is satisfied as represented by a NO at step 132, then the photo pickup head 21 is determined to be on the dead zone of the track, and the routine proceeds from step 132 to step 141. In step 141, the amplifier 43 is supplied with an extra pulse Ps', as shown phantom line in FIG. 9B, whereby the photo pickup head 21 is urged to move by several 10s of tracks which are the number between the track jump number in step 105 and the track jump number in step 121, for example, 60 tracks. In the next step 142, the amplifier 32 is supplied with a track jump pulse TRJ having a duration sufficient to carry out a track jump of substantially the same numbers of tracks to be jumped as in step 141, for example, a track jump of 60 tracks. Then, the routine returns to step 106.

As described above, the sled movement is carried out by an amount corresponding to 60 tracks in step 141 and a track jump corresponding to 60 tracks is effected in step 142, whereby the objective lens in the photo pickup head 21 is located, for example, at substantially the center of the laser beam.

Therefore, if it is determined in decision step 132 that X>20 is satisfied, or the area is regarded as the dead zone track area, even though a track jump is carried out in steps 105 and 121, the muting of the period Tj is not terminated and step 106 and the following steps are repeated. Thereby, steps 141 and 142 are repeated until the photo pickup head 21 leaves the dead zone track area.

Figure 5A:
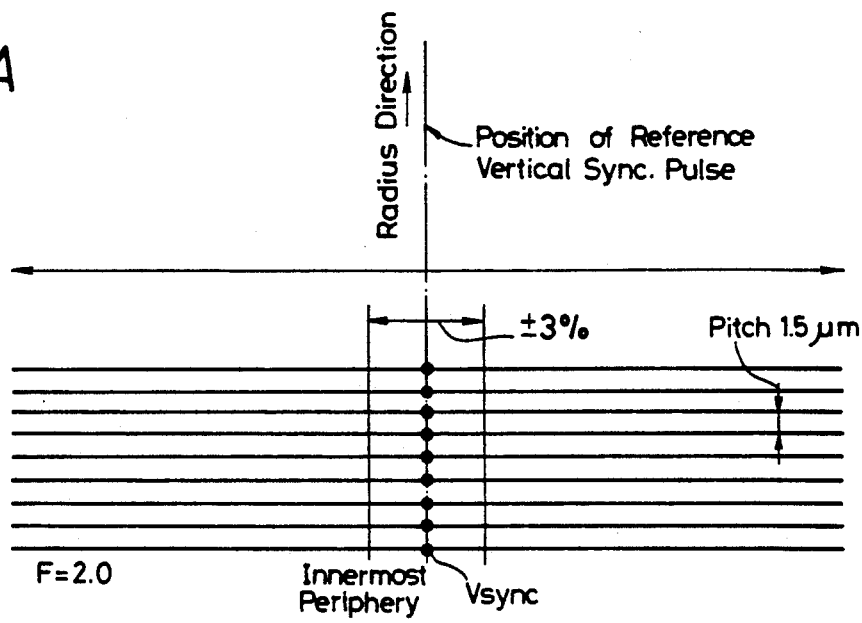
FIGS. 5A to 5C are fragmentary, enlarged views of tracks on a video disk, and to which reference will be made in explaining a relationship between a track and a vertical synchronizing pulse, respectively.
Figure 5B:
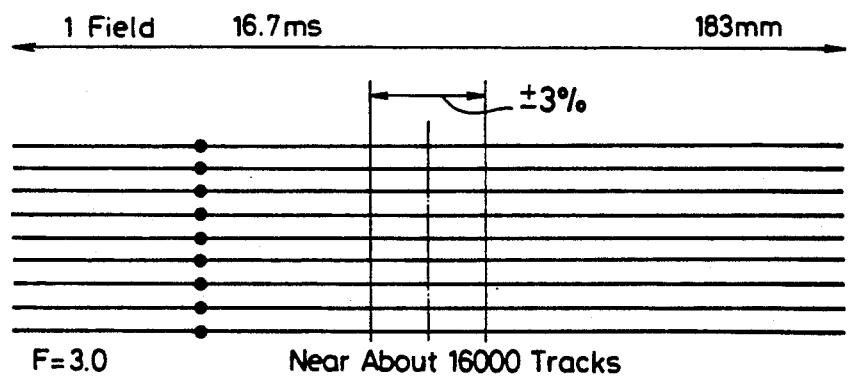
Figure 5C:
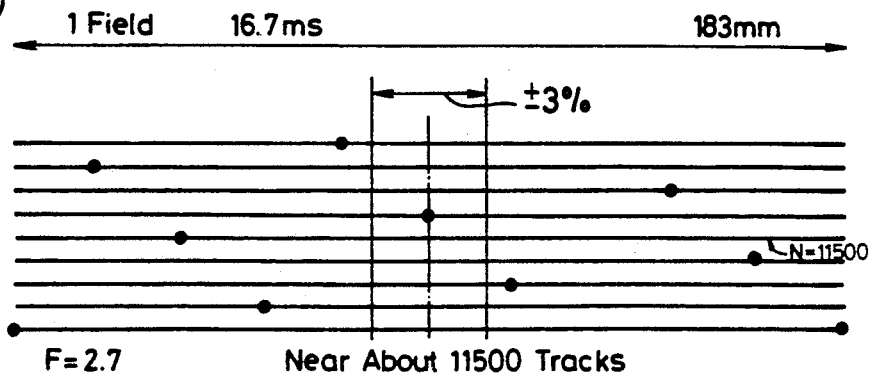
Figure 6:
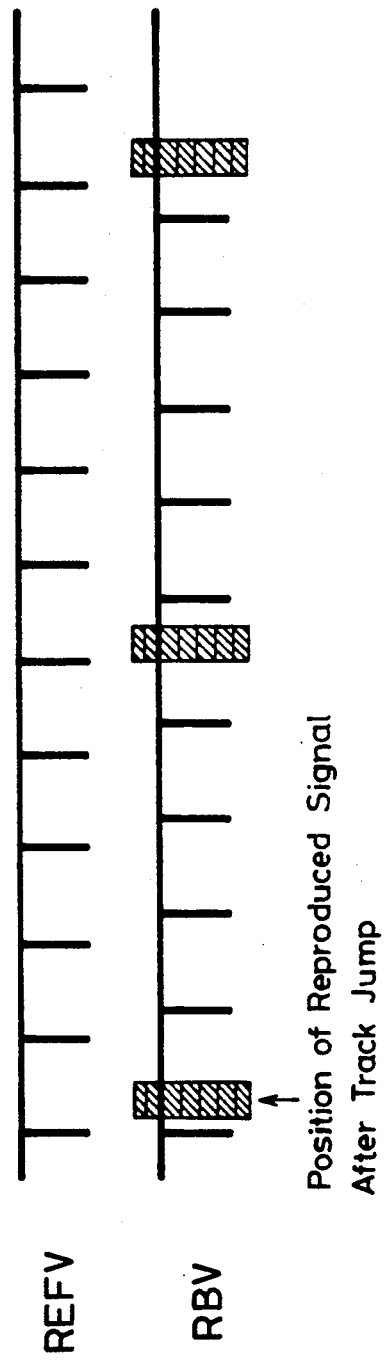
FIG. 6 is a schematic diagram showing a vertical synchronizing pulse of a reproduced signal and a reference vertical synchronizing pulse, and to which reference will be made in explaining the prior art.
Figure 7A:
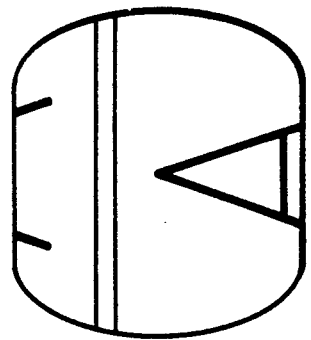
FIGS. 7A to 7C are schematic diagrams of pictures reproduced on a picture screen of a television monitor receiver, and to which reference will be made in explaining defects of the prior art.
Figure 7B:
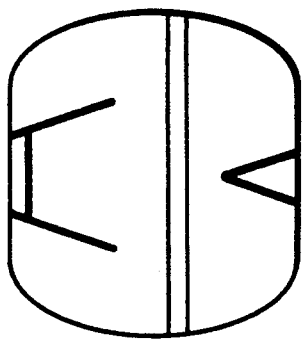
Figure 7C:
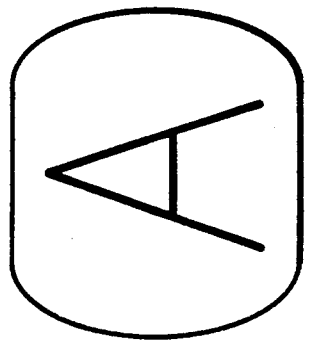
Figure 11:
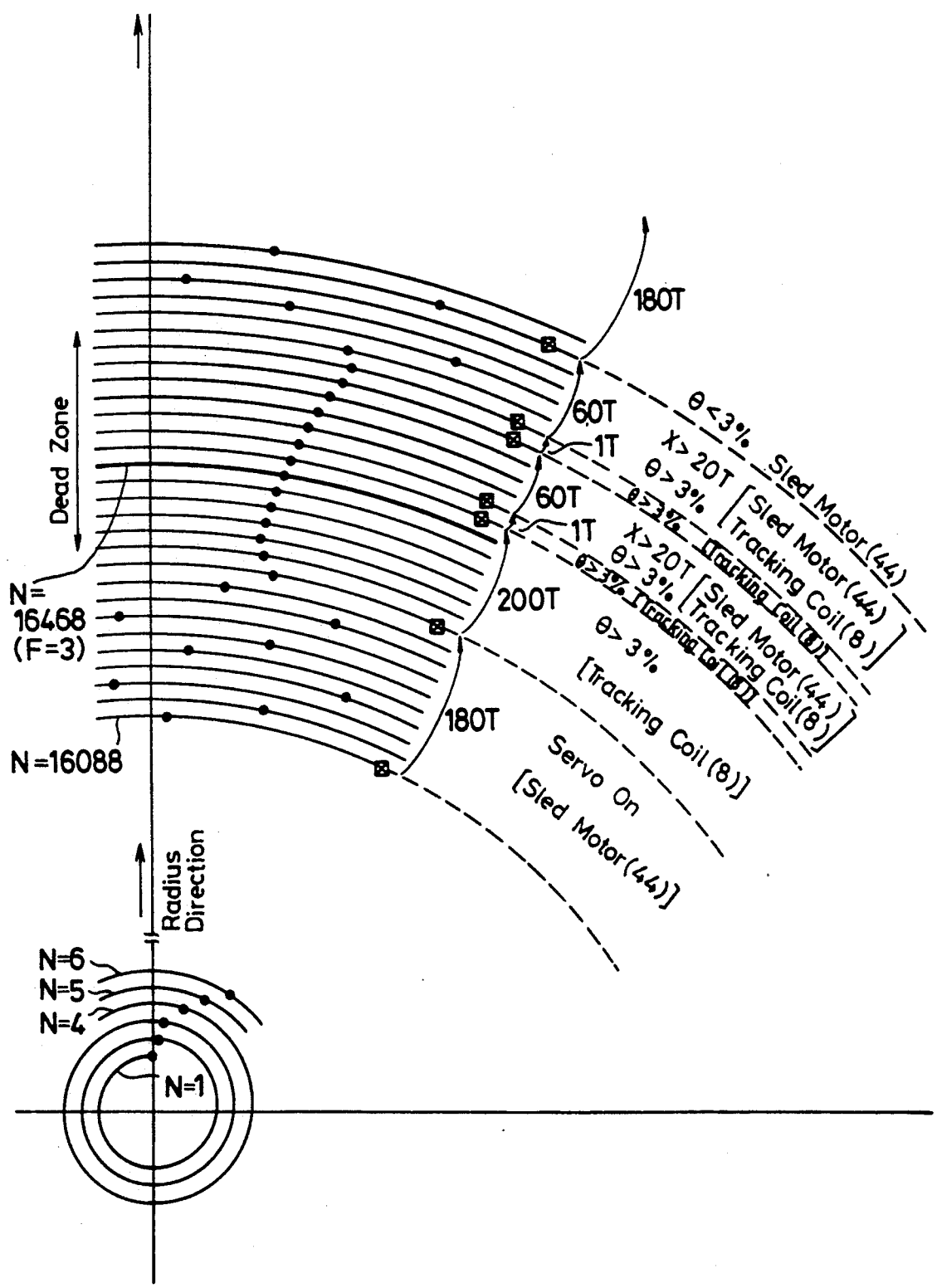
FIG. 11 is a schematic diagram of the track patterns formed on the optical video disk, and to which reference will be made in explaining the concept of the steps involved in the routine of the flow chart in FIG. 10.

The concept embodied in steps 101 to step 142 is represented by the track pattern in FIG. 11. FIG. 11 shows a portion near a track N=16468 in which visual images of 3 fields are recorded within one track, and a dead zone track area appears around the track N=16468. As shown in FIG. 11, near N=1 to N=7, the angular positions of the vertical synchronizing pulses (shown by solid circles) Vsync are gradually displaced. In the vicinity of N=16468, for example, around N=16088, the positions of the vertical synchronizing pulses are dispersed with a predetermined pattern. Then, near the track of N=16468, the positions of the vertical synchronizing pulses become close to each other. This state is represented in FIG. 5B (the positions of the vertical synchronizing pulses are all illustrated in somewhat exaggerated fashion).

In FIG. 11, the position of the photo pickup head 21 is represented by □, and the jump amount, the next jump condition, and whether or not the jump pulse is supplied to the sled motor 44 and the tracking coil 8 are indicated together in FIG. 11.

If the photo pickup head 21 leaves the dead zone track area, $|\Theta| \leq 3\%$ is satisfied in step 108 or step 124 or X≤20 is satisfied in step 132, whereby the routine proceeds to step 112. In step 112, the period Tj is terminated and the gray picture is switched to the reproduced picture of the optical video disk 10. In that case, a disturbance of the vertical synchronization can be avoided.

If the scan reproduction key 71 is released from being depressed in order to stop the scan reproduction, this is identified at step 113, and the routine proceeds from step 113 to step 114. In step 114, the switching circuit 26 is connected to the illustrated state (NR-position) and the routine 100 ends with step 115. Thus, from the time point of step 114, the reproduced picture is switched to the reproduced picture of the optical video disk 10. In that case, owing to steps 108, 124 or step 133, the vertical synchronization can be prevented from being disturbed.

Let us describe briefly how to calculate the track number necessary for satisfying $|\Theta| \leq 3\%$ in step 131.

Figure 12:
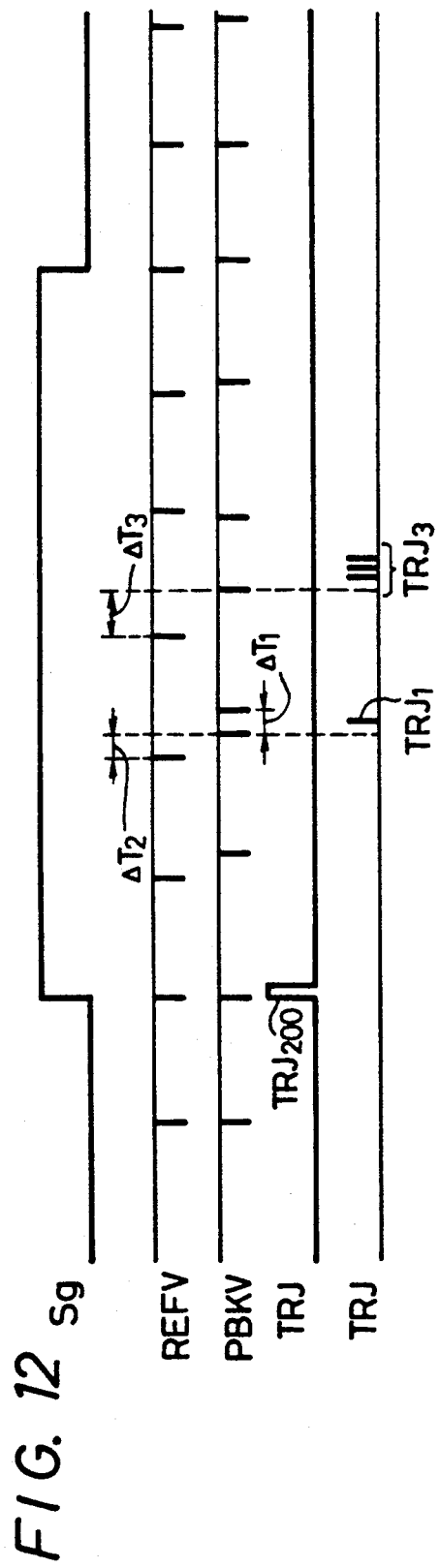
FIG. 12 is a waveform diagram to which reference will be made in explaining how to calculate the track number which is needed to satisfy $|\Theta| \leq 3\%$.

In FIG. 12, there are shown phases REFV, PBKV of the reference and reproduced synchronizing pulses, respectively, a jump pulse $TRJ_{200}$ of 200 tracks in step 105 and a jump pulse $TRJ_1$ of one track in step 121. A phase difference $\Delta T2$ between the phases REFV and PBKV before one track jump pulse $TRJ_1$ is supplied to the tracking coil 8 and a phase difference $\Delta T3$ between the phases REFV and PBKV after one track jump pulse $TRJ_1$ is supplied to the tracking coil 8 are respectively detected, thereby detecting a phase difference $\Delta T1$ caused in the reproduced vertical synchronizing pulse by one track jump. By using the phase differences $\Delta T1$ and $\Delta T3$, it is possible to estimate the optimum track number which satisfies the inequality of $|\Theta| \leq 3\%$ by means of calculation. In FIG. 12, reference $TRJ_3$ denotes a pulse (e.g., three pulses) which is used to move the photo pickup head 21 by the necessary track number.

According to the present invention, the scan-reproduction is carried out as described above. Particularly, according to the present invention, when a large track jump for the scan-reproduction is effected, the phase difference Θ of the reproduced vertical synchronizing pulse PBKV is checked. If the phase difference is large so that the vertical synchronization is disturbed, a track jump of several tracks (for example, one track jump) is carried out or a track jump of X tracks (for example, within 20 tracks), which can not cause a disturbance of the vertical synchronization, is carried out. Further, if the phase difference Θ is still large so that the vertical synchronization is disturbed, then it is determined that the photo pickup head 21 is located in the dead zone track area. Then, a track jump of a medium-number (for example, a track jump of 60 tracks) is successively carried out until the photo pickup head 21 leaves the dead zone track area. Therefore, in the scan-reproduction mode, the vertical synchronization in the reproduced picture can be prevented from being disturbed, a black band can be prevented from appearing in the picture, and the upper half and the lower half of the picture can be prevented from replacing each other. Thus, it is possible to make a scan-reproduced picture of excellent image quality which is easy to see.

In the dead zone track area, a medium-number of track jumps are carried out, whereby the photo pickup head 21 can readily leave the dead zone track area. Simultaneously, when the photo pickup head 21 leaves the dead zone track area, the photo pickup head 21 can be prevented from being located considerably distant from the dead zone track area.

Further, when the photo pickup head 21 jumps by a track jump at step 105 to a track in which a video signal, for example, of 2.5 fields is recorded in one revolution of the disk and in which $\Theta = \frac{1}{2}$ field period is satisfied (for example, track of N=8234 provided by substituting F=2.5 into the equation (iii)), a track jump of one track is effected in step 121, whereby $\Theta \approx 0$ can be satisfied, thus making it possible to immediately terminate the period Tj.

Figure 13:
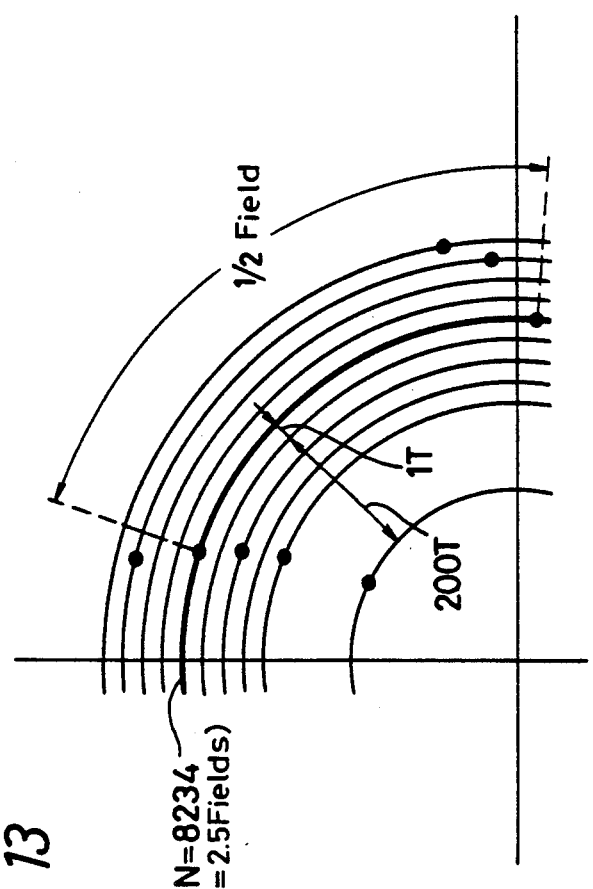
FIG. 13 is a fragmentary, enlarged view of a track pattern, and to which reference will be made in explaining an operation of the present invention.

As shown in FIG. 13, in the vicinity of, for example, the track N=8234 in which the field number is 2.5 fields in one revolution of the disk, the positions of the recorded vertical synchronizing pulses are located close to each other at every two tracks so that even when the phase difference between the target reproduced vertical synchronizing pulse and the actual reproduced vertical synchronizing pulse is ½ field after a track jump of 200 tracks at step 105, $|\Theta| \leq 3\%$ can be satisfied only by a track jump of one track.

The object of a one track jump in step 121 is not limited to the above-mentioned objects, and one track jump can be utilized to effect the calculation of the necessary track number X in the aforementioned step 131.

It will be noted in the above description that sometimes a track jump is performed, which is accomplished by a quick movement of the objective lens, whereas in other cases the sled motor moves the entire optical block. The former step is employed where a rapid movement is needed since the sled motor, because of its inertia, is unable to respond with the same high speed.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

I claim as my invention

1. A video disk player for reproducing a video disk in scan mode, the video disk having tracks of information previously recorded according to a constant linear velocity (CLV) format, comprising:
   (a) photo pickup means for reproducing a video signal from the video disk, the photo pickup means including an objective lens having an optical axis;
   (b) tracking servo means supplied with the output of the photo pickup means for effecting a tracking servo of the photo pickup means;
   (c) first means for selectively moving the optical axis of the objective lens in the radial direction relative to the video disk to produce a track jump;
   (d) second means for generating a pseudo-video signal;
   (e) third means for generating a reference vertical frequency signal;
   (f) an output terminal;
   (g) switching means connected to receive the output of the photo pickup means and the pseudo-video signal of the second means and for selectively supplying one of them to the output terminal; and
   (h) programmed control means supplied with the output of the photo pickup means for
      (i) causing the first means during a scan mode to carry out a first track jump of a relatively large number of tracks for the video disk while causing the switch means to supply the pseudo-video signal instead of the reproduced video signal to the output terminal,
      (ii) extracting a vertical synchronizing signal from the reproduced information recorded on the disk and detecting a phase difference between a vertical synchronizing pulse of the reproduced video signal and the reference vertical frequency signal after the first track jump is carried out,
      (iii) causing the switch means to supply the reproduced video signal instead of the pseudo-video signal to the output terminal when the detected phase difference is smaller than a predetermined value,
      (iv) calculating, when the detected phase difference is larger than the predetermined value, the number of tracks which must be jumped for the phase difference to become smaller than the predetermined value,
      (v) determining, when the calculated number of tracks to be jumped is larger than a predetermined value, that the position of the photo pickup means lies in a dead zone track area relative to the position of the vertical synchronizing pulse of the recorded video signal, and causing the first means to carry out a second track jump of a medium number of tracks for the video disk when the dead zone track area is determined, thereby urging the photo pickup means to leave the dead zone track area.

2. A video disk player for reproducing a video disk in scan mode as recited in claim 1, further comprising manually operable scan mode control key means and wherein the programmed control means detects when the scan mode control key means is operated in the scan mode and repeats operations (i) through (v).

3. A method of reproducing a video disk in the scan mode by means of a video disk player of the type having a photo pickup head for reproducing a video signal from the video disk, the video disk having tracks which have been previously recorded according to a constant linear format, comprising the steps of:
   (a) generating a reference vertical frequency signal;
   (b) causing the photo pickup head to make a first track jump in the radial direction of a relatively large number of tracks while generating as the output of the video disk player a pseudo-video signal instead of the video signal reproduced from the recorded information in the tracks in the scan reproducing mode;
   (c) detecting a phase difference between a vertical synchronizing pulse of the reproduced video signal and the reference vertical frequency signal after the first track jump is carried out;
   (d) generating as the output of the video disk player the reproduced video signal instead of the pseudo-video signal when the detected phase difference is smaller than a predetermined value;
   (e) calculating, when the phase difference is larger than the predetermined value, the necessary number of tracks which must be jumped for the phase difference to become smaller than the predetermined value;
   (f) determining, when the calculated number of tracks to be jumped is larger than a predetermined value, that the position of the photo pickup head lies in a dead zone track area relative to the position of a vertical synchronizing pulse of the recorded video signal; and
   (g) carrying out a second track jump of a medium number of tracks for the video disk when the dead zone track area is determined, thereby urging the photo pickup head to leave the dead zone track area.

4. The method of claim 3 wherein when the necessary number of tracks to be jumped is less than the predetermined value, a third track jump of the calculated number of tracks is carried out to thereby generate the reproduced video signal as the output of the video disk player.

5. The method of claim 4 wherein a fourth very small track jump of less than several tracks is carried out between the first track jump and the step for calculating the necessary number of tracks to be jumped, determining the phase difference between the reproduced vertical synchronizing pulse after the fourth track jump and the reference vertical synchronizing pulse, and calculating the necessary number of tracks to be jumped based on this detected phase difference.

6. The method of claim 5 wherein the video disk player includes a time base corrector and when the phase difference between the reproduced vertical synchronizing pulse and the reference vertical synchronizing pulse becomes smaller than the predetermined value after the first, second and third track jumps, the reproduced video signal is generated as the output of the video disk player only after counting at least several reference vertical synchronizing pulses which are required such that the time base corrector can operate stably.

7. The method of claim 4 wherein the video disk player includes a time base corrector and when the phase difference between the reproduced vertical synchronizing pulse and the reference vertical synchronizing pulse becomes smaller than the predetermined value after the first, second and third track jumps, the reproduced video signal is generated as the output of the video disk player only after counting at least several reference vertical synchronizing pulses which are required such that the time base corrector can operate stably.

8. The method of claim 3 wherein the video disk player includes a time base corrector and when the phase difference between the reproduced vertical synchronizing pulse and the reference vertical synchronizing pulse becomes smaller than the predetermined value after the first, second and third track jumps, the reproduced video signal is generated as the output of the video disk player only after counting at least several reference vertical synchronizing pulses which are required such that the time base corrector can operate stably.

9. The method of claim 4 wherein the photo pickup head includes an objective lens whose optical axis is selectively movable radially and the track jump steps are accomplished by moving the optical axis of the objective lens radially.

10. The method of claim 9 further comprising the step of moving the photo pickup head radially by several tracks corresponding to the second track jump amount just before the second track jump step.

* * * * *